United States Patent
Tracey

(10) Patent No.: US 6,851,117 B2
(45) Date of Patent: Feb. 1, 2005

(54) SUPPLANTING MOTIF DIALOG BOXES VIA MODIFYING INTERCEPTED FUNCTION CALLS FROM AN APPLICATION

(75) Inventor: David C. Tracey, Louth (IE)

(73) Assignee: Sun Microsystems, Inc., Santa Clara, CA (US)

( * ) Notice: Subject to any disclaimer, the term of this patent is extended or adjusted under 35 U.S.C. 154(b) by 464 days.

(21) Appl. No.: 09/865,287

(22) Filed: May 25, 2001

(65) Prior Publication Data

US 2002/0178302 A1 Nov. 28, 2002

(51) Int. Cl.$^7$ ................................................. G06F 9/00
(52) U.S. Cl. ....................... 719/329; 719/328; 709/227; 709/228
(58) Field of Search .............................. 709/227, 228, 709/310; 719/328, 329

(56) References Cited

U.S. PATENT DOCUMENTS 5,596,702 A  *  1/1997  Stucka et al. ............... 345/746
5,600,789 A  *  2/1997  Parker et al. .................. 714/38
6,118,446 A  *  9/2000  Jones et al. .................. 717/105

OTHER PUBLICATIONS

John Kacur, Red Hat Motif 2.1 for Linux, May 1, 1999, www.linuxjournal.com, issue 61.*

* cited by examiner

Primary Examiner—Nabil El-Hady
(74) Attorney, Agent, or Firm—Martine & Penilla, LLP

(57) ABSTRACT

A technique for supplanting the display of a Motif dialog box is disclosed. In a first aspect, the invention includes a method for supplanting a Motif dialog box. The method comprises interposing a functionality between a graphical interface of an application and an Xt Library layered on top an X-Window system; intercepting a function call from the graphical interface for a display of a Motif dialog box from the X-Window system; determining whether the Motif dialog box is to be supplanted; and supplanting the Motif dialog box. In a second aspect, the invention includes a computing system programmed to supplant a Motif dialog box. The computing system comprises an application including a graphical interface; an X-Window system; an Xt library layered on top the X-Window system; and an interposed library interposed between the graphical interface and the Xt library. The Xt Library includes an original function for calling a display of a Motif dialog box. The interposed library includes an interposed function for intercepting the call for the display of the Motif dialog box, determining whether the Motif dialog box is to be supplanted, and supplanting the Motif dialog box.

38 Claims, 3 Drawing Sheets

SUPPLANTING MOTIF DIALOG BOXES VIA MODIFYING INTERCEPTED FUNCTION CALLS FROM AN APPLICATION

BACKGROUND OF THE INVENTION

1. Field of the Invention

The present invention pertains to user interfaces in a computing environment, and, more particularly, to a technique for supplanting Motif dialog boxes.

2. Description of the Related Art

One important aspect of any computing environment is the user interface through which a user interacts with a computing system. That the user interface is the mechanism through which the user actually controls the computing environment is only the most obvious reason for its importance. There are many, more subtle, reasons for the user interface's importance. For instance, the user interface may allow access to the lower levels of the computing system's architecture (e.g., the computing system's operating system) that control the computing system's inner workings. The user interface, therefore, potentially offers an opportunity for a rogue program or a malicious user to penetrate the computing system's security. From an economic standpoint, the user interface affects the usability of a computing system. Poorly designed user interfaces are difficult to use, while well designed user interfaces are easier to use. All else being equal, users generally prefer a computing system that is easier to use. The user interface can therefore significantly influence a potential user's buying decision.

Recent years have brought some standardization, although not necessarily uniformity, to user interfaces. One common user interface is the X-Window system, which is a public domain windowing and graphics system. There are several variants of X-Window systems, including Motif and OpenLook. Because X-Window is public domain, it is particularly attractive to users employing UNIX operating systems. Because UNIX operating systems are popular, many applications employ user interfaces such as Motif and OpenLook that are based on X-Window. Netscape Navigator™ and the Adobe Acrobat™ reader on UNIX systems, for instance, both use Motif dialog boxes to communicate with users.

However, because of concerns such as security and usability, vendors of computing systems may wish to alter the user interface of some applications. The vendor may, for instance, wish to restrict the fields of some dialog boxes in which a user can enter information. The vendor might also wish to completely suppress some functions invoked by a user through such a dialog box. The vendor may not have the right to alter the source code of the application to do this. Even if the vendor does have the right, this presents problems since the application is now a "custom" piece of software. This may be undesirable if the vendor prefers to simply buy applications directly from their third party manufacturer and install them, or if the vendor does not wish to provide maintenance for the software once the computing system is sold. Preferably, the vendor could use some mechanism that modifies the interaction between the user and the application without having to modify the application itself. However, there is no such mechanism currently available in the X-Window environment.

SUMMARY OF THE INVENTION

The present invention is a technique for supplanting the display of a Motif dialog box. In a first aspect, the invention includes a method for supplanting a Motif dialog box. The method comprises interposing a functionality between a graphical interface of an application and an X-Toolkit Intrinsics ("Xt") Library layered on top an X-Window system; intercepting a call from the graphical interface for a display of a Motif dialog box from the X-Window system; determining whether the Motif dialog box is to be supplanted; and supplanting the Motif dialog box. In a second aspect, the invention includes a computing system programmed to supplant a Motif dialog box. The computing system comprises an application including a graphical interface; an X-Window system; an Xt library layered on top the X-Window system; and an interposed library interposed between the graphical interface and the Xt library. The Xt Library includes an original function for calling a display of a Motif dialog box. The interposed library includes an interposed function for intercepting the call for the display of the Motif dialog box, determining whether the Motif dialog box is to be supplanted, and supplanting the Motif dialog box.

BRIEF DESCRIPTION OF THE DRAWINGS

The invention may be understood by reference to the following description taken in conjunction with the accompanying drawings, in which like reference numerals identify like elements, and in which.

Figure 1:
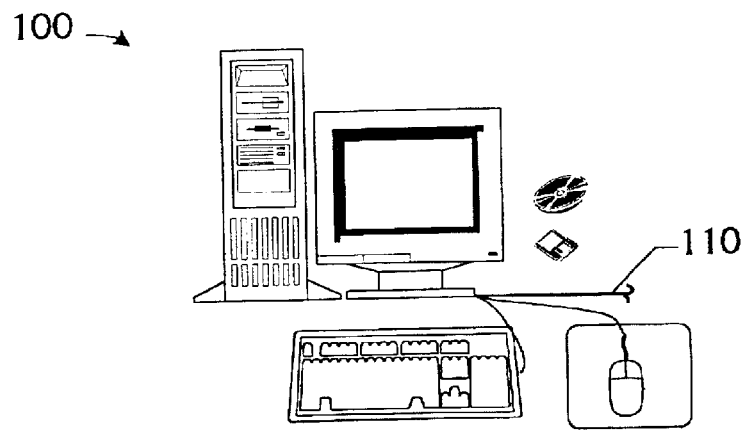
FIG. 1 depicts an electronic computing device programmed and operated in accordance with one particular embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2A:
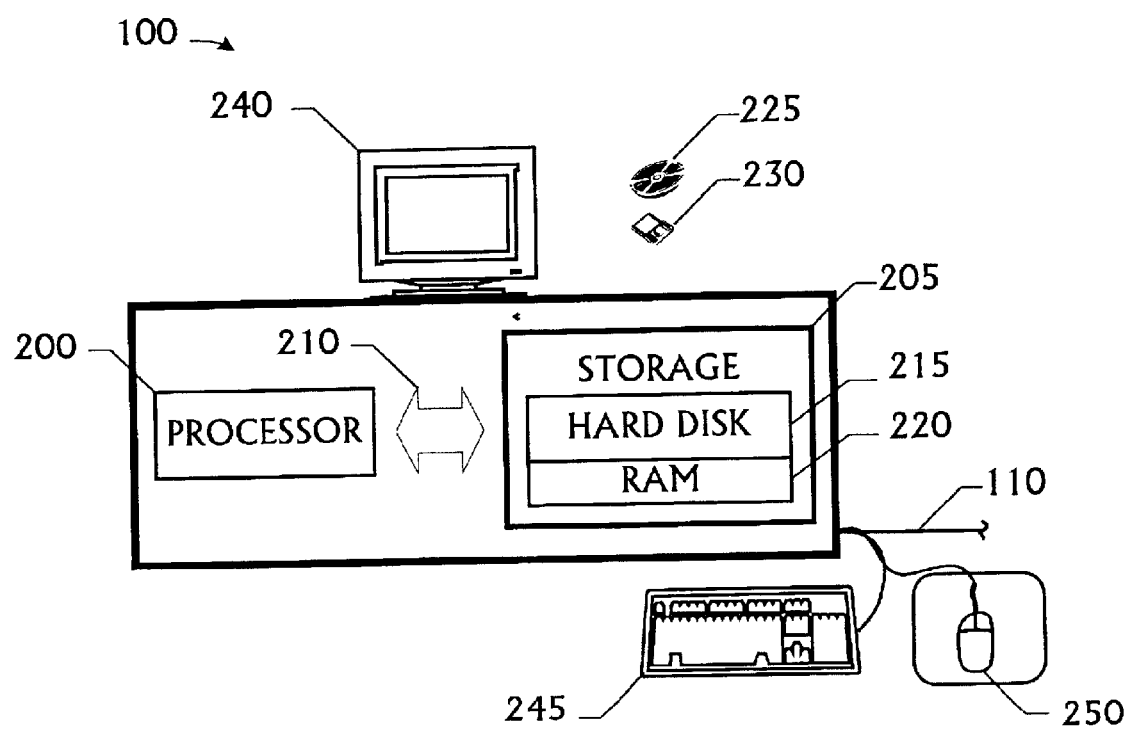
FIG. 2A and FIG. 2B conceptually illustrate selected portions of the hardware and software architectures of the electronic computing device of FIG. 1.
Figure 2B:
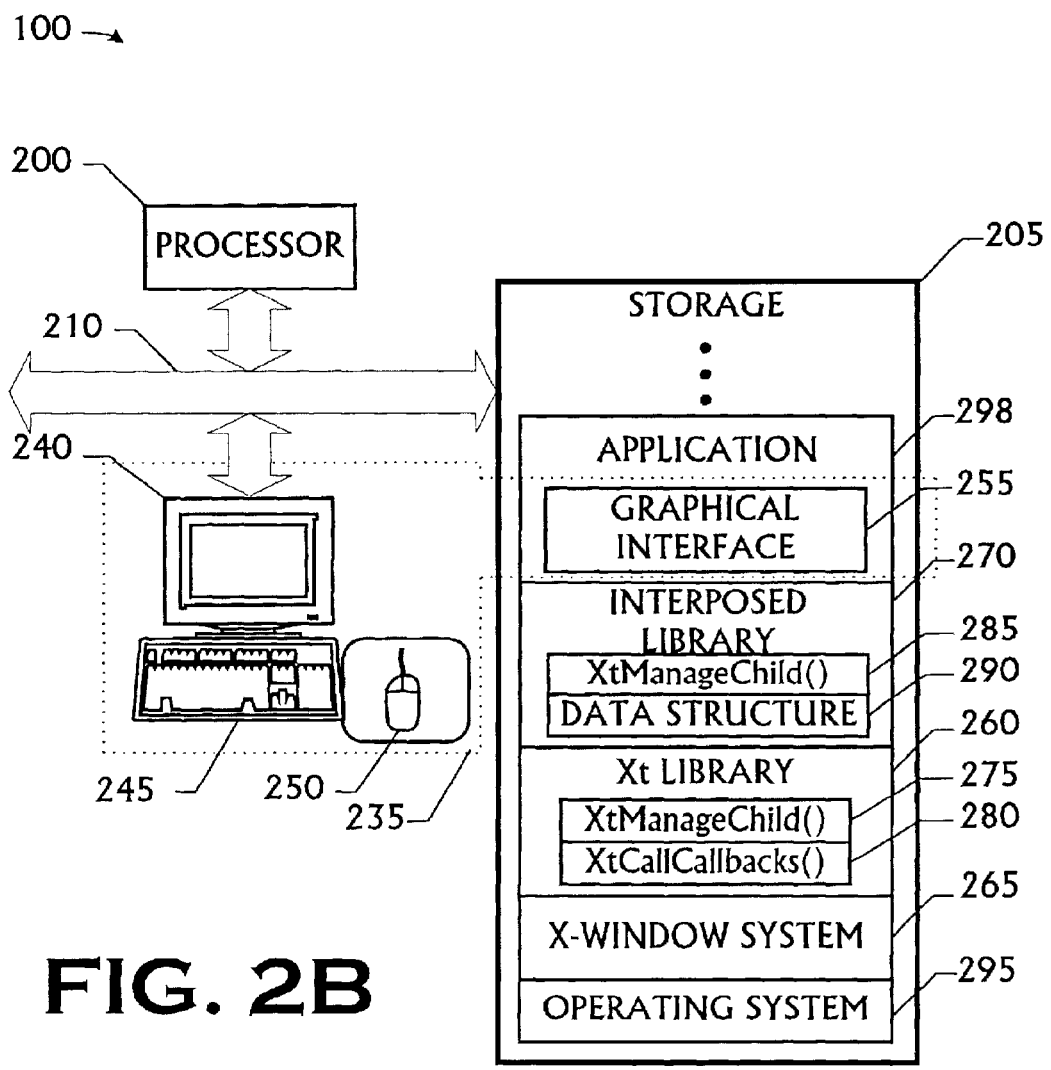

FIG. 1 depicts a computing device 100 programmed and operated in accordance with the present invention. Selected portions of the hardware architecture and the software architecture of the computing device 100 relevant to the present invention are illustrated in FIG. 2A and FIG. 2B, respectively. Some aspects of the hardware and software architectures (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing device 100 will include many such routine features.

Turning to FIG. 1, in the illustrated embodiment, the computing device 100 is a Sun Ray™ server employing a UNIX-based operating system (i.e., a Solaris™ OS) commercially available from the assignee of this application, Sun Microsystems, Inc. However, the invention is not so limited. The invention may be implemented in virtually any electronic computing device running a Motif window manager on a UNIX-based operating system.

Thus, the computing device 100 may be, in alternative embodiments, some other type of computer.

Referring now to FIG. 2A, the computing device 100 includes at least one processor 200 communicating with some storage 205 over a bus system 210. The storage 205 will typically include at least a hard disk 215 and some random access memory ("RAM") 220. The computing device 100 may also include removable storage such as an optical disk 225, a floppy electromagnetic disk 230, or some other form, such as a magnetic tape or a zip disk (not shown). The processor 200 may be any suitable processor known to the art. For instance, the processor may be a microprocessor or a digital signal processor ("DSP"). In the illustrated embodiment, the processor 200 is an UltraSPARC™ 64-bit processor available from Sun Microsystems, but the invention is not so limited. The microSPARC™ from Sun Microsystems, any of the Itanium™ or Pentium™-class processors from Intel Corporation, the Athlon™ or Duron™ class processors from Advanced Micro Devices, Inc., and the Alpha™ processor from Compaq Computer Corporation might be employed.

Referring now to FIG. 2A and FIG. 2B together, the computing device 100 includes a user interface 235 (shown in FIG. 2B) comprising a monitor 240, a keyboard 245, a mouse 250, and a graphical interface 255. The graphical interface 255 comprises a portion of an application 298. The graphical interface 255 is a Motif graphical interface such as is well known in the art and commonly employed in association with UNIX-based operating systems. Conceptually, in conventional systems, the graphical interface 255 is interposed on what is known as an "Xt library" 260, that is layered on top an X-Window system 265. The Xt library 260 provides a framework for creating, destroying, and displaying reusable user interfaces called "widgets," which are implemented as Motif dialog boxes in the present invention. However, the present invention interposes another library 270, hereafter referred to as the "interposed library" 270, between the Xt library 260 and the Xt application 298.

The Xt library 260 contains a variety of functions that are well known in the art, including an:

XtManageChild( ) function 275, which manages widgets and is used to pop up dialog boxes for the graphical interface 255; and XtCallCallbacks( ) function 280, which calls the callbacks for events, such as when buttons are pressed in such a dialog box.

For present purposes, and for reasons that will become apparent below, the XtManageChild( ) function 275 shall hereafter be referred to as the "original" XtManageChild( ) function 275.

The interposed library 270 includes, inter alia, an XtManageChild( ) function 285 and a data structure 290. For present purposes, and for reasons that will become apparent below, the XtManageChild( ) function 285 shall hereafter be referred to as the "interposed" XtManageChild( ) function 285. The data structure 290 in one particular implementation is a string of pointers, but any suitable type of data structure known to the art may be employed. The data structure 290 stores the names of dialog boxes to be modified or suppressed in accordance with the present invention, as is discussed further below. Note that the dialog boxes may be dialog boxes used in, inter alia, printing, opening, closing, moving or copying files.

When the interposed library 270 is installed, an OS environment variable LD_PRELOAD is used to load the interposed library 270 on to the Xt library 260. This may be done in the startup script for the application 298 or in a command line, for instance.

In operation, a user (not shown) opens the application program 298 through the user interface 235 and the operating system 295. The application program 298 may be any X-Window compatible application, e.g., the Netscape Navigator™ browser or the Adobe Acrobat™ reader. At some point, the user employs a feature of the application program 298 that includes the display of a dialog box. The graphical interface 255 calls the interposed XtManageChild( ) function 285 through the operating system 295. The interposed XtManageChild( ) function 285 then calls the dlopen( ) function, a dynamic linking library function from the OS 295, to get a pointer to the original XtManageChild( ) function 275 and the XtName( ) function from the Xt Library 260, which returns the name of the dialog box to be displayed. The interposed XtManageChild( ) function 285 then checks this returned name against a list of names stored in the data structure 290.

Interposition techniques are not unknown in the art. As mentioned above, the interposed XtManageChild( ) function 285 calls the dlopen( ) function. Note that the dlopen( ) function, as well as the LD_PRELOAD, are well known to those in the art and are known to have been used in a variety of interposition techniques employed for unrelated purposes. None of these interposition techniques are known to have been used to modify a user interface in any way. However, those in the art having the benefit of this disclosure can modify those interposition techniques for the application of the present invention in accordance with the disclosure herein.

If the dialog box is one that is to be modified, the interposed XtManageChild( ) function 285 supplants the original dialog box of the application program 298 by either presenting it in a modified form or suppressing it altogether. In one embodiment, the interposed XtManageChild( ) function 285 modifies selected parameters. The interposed XtManageChild( ) function 285 then calls the original XtManageChild( ) function 275, passing it the modified parameters, which results in a modified dialog box being presented. For instance, the interposed XtManageChild( ) function 285 may alter the sensitivity of a print text box to not allow a user to enter data in a certain field. In alternative embodiments, the interposed XtManageChild( ) function 285 suppresses the dialog box altogether by calling the XtCallCallbacks( ) function 280 to call one of the box's button callbacks. The original XtManageChild( ) function 275 is not called at all, and so the dialog box is never presented—even in a modified form. In some embodiments, the interposed XtManageChild( ) function 285 either modifies or suppresses the dialog box depending on the name returned by the function XtName( ).

Figure 3:
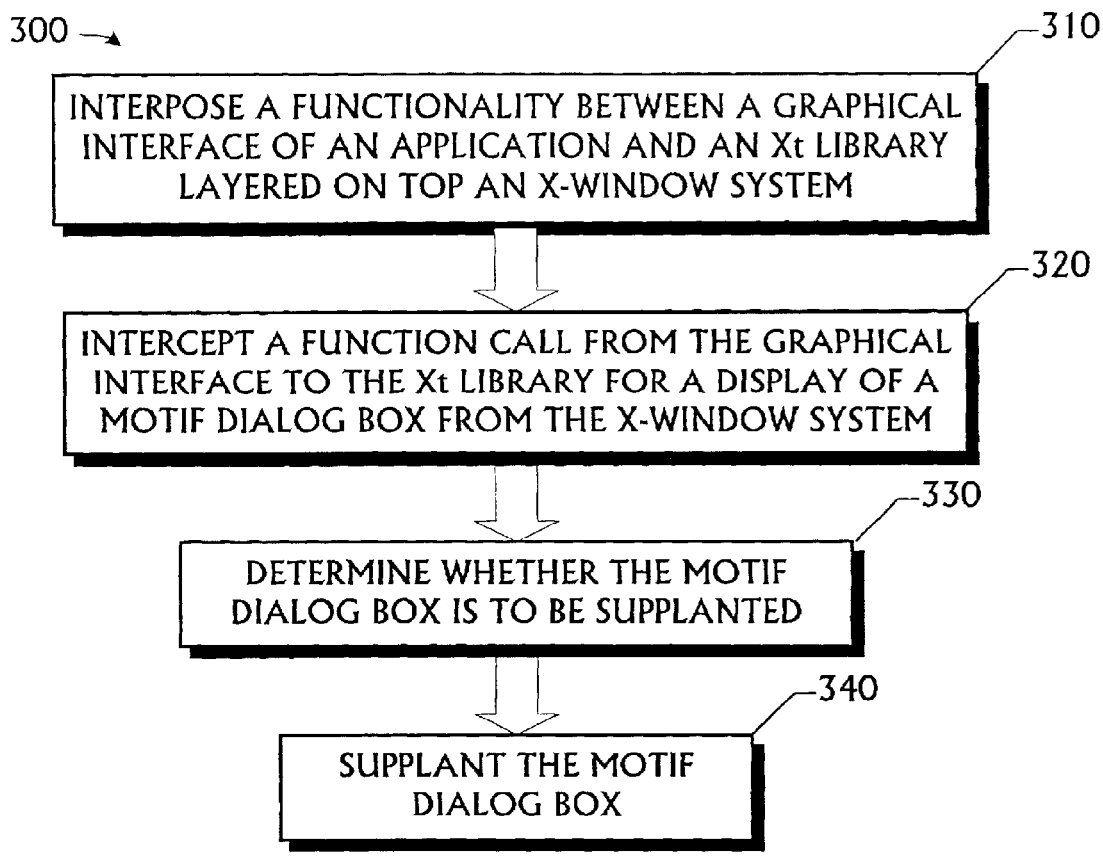
FIG. 3 illustrates one particular embodiment of a method for supplanting the display of a Motif dialog box.

Extrapolating to a more general case, the present invention, in one aspect, comprises a method 300 for supplanting a Motif dialog box, illustrated in FIG. 3. The method 300 comprises:

interposing a functionality between a graphical interface of an application and an Xt Library layered on top an X-Window system, as set forth in the box 310;

intercepting a call from the graphical interface for a display of a Motif dialog box from the X-Window system, as set forth in the box 320;

determining whether the Motif dialog box is to be supplanted, as set forth in the box 330; and supplanting the Motif dialog box, as set forth in the box 340.

As is evident from the above detailed description of the illustrated embodiment:

intercepting a function call from the graphical interface may include calling an interposed function (e.g., the interposed XtManageChild( ) function 285) corresponding to an original function (e.g., the original XtManageChild( ) function 275 or the XtCallCallbacks( ) function 280);

the method 300 may further comprise redirecting the application program 298's function call from the original function (e.g., the original XtManageChild( ) function 275 or the XtCallCallbacks( ) function 280) to the interposed function (e.g., the interposed XtManageChild( ) function 285);

determining whether the Motif dialog box is to be supplanted may include calling a naming function (e.g., the XtName( ) function) to identify the Motif dialog box in the intercepted call; and comparing the name returned by the naming function (e.g., the XtName( ) function) against a plurality of Motif dialog box names that are to be supplanted;

intercepting the call may include calling an interposed function (e.g., the interposed XtManageChild( ) function 285) corresponding to an original function (e.g., the original XtManageChild( ) function 275) or call another function (e.g., the XtCallCallbacks( ) function 280) from the interposed library 270;

supplanting the Motif dialog box may include modifying at least one parameter in the intercepted call; re-calling the display of the Motif dialog box with the modified parameter(s) set by another Xt function call (e.g., XtSetValues( ) or XtSetSensitive( )); and displaying a modified Motif dialog box; and supplanting the Motif dialog box may include calling a callback function; and suppressing the Motif dialog box.

Those skilled in the art having the benefit of this disclosure will appreciate still other implementations by which the method 300 may be implemented.

Figure 4:
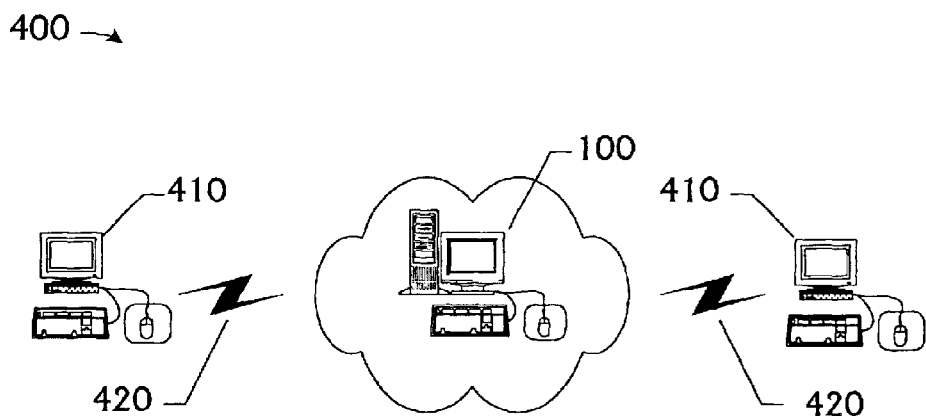
FIG. 4 illustrates a computing system of which the computing device of FIG. 1 comprises a portion.

The computing device 100 may comprise a portion of a larger computing system 400, shown in FIG. 4, by a connection over the line 110, shown in FIG. 1 and FIG. 2A. The computing system 400 may be a local area network ("LAN"), a wide area network ("WAN"), a system area network ("SAN"), an intranet, or even the Internet. The computing system 400 implements a client/server architecture, with the computing device 100 providing the server function for the computing system 400. The clients 410 in the illustrated embodiment are workstations (e.g., the Sun Blade™ or the Ultra™ line of workstations) also employing a UNIX-based operating system (e.g., a Solaris™ OS) running Motif and an X-Window system. However, the invention is not so limited. The computing device 100 may be implemented in virtually any type of electronic computing device such as a laptop computer, a desktop computer, a mini-computer, a mainframe computer, or a supercomputer. The communications links 420 over which the server 100 and the clients 410 communicate may be twisted wire pairs, coaxial cable, optical fiber, or some other suitable transmission medium known to the art. In some embodiments, the communications links 420 may even be wireless. Note that, in embodiments such as that illustrated in FIG. 4, the application 298 may reside on a computing device such as one of the clients 410 rather than on the server 100.

Some portions of the detailed descriptions herein are consequently presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access.

This concludes the detailed description. The particular embodiments disclosed above are illustrative only, as the invention may be modified and practiced in different but equivalent manners apparent to those skilled in the art having the benefit of the teachings herein. For instance, the invention may be implemented in some embodiments in UNIX-based operating systems employing some other types of window managers, e.g., OpenLook™, utilizing the Xt Library of the Xt Window System. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for supplanting a Motif dialog box, comprising:

interposing a functionality between a graphical interface of an application and an Xt Library layered on top of an X-Window system;

intercepting an original function call from the graphical interface for a display of a Motif dialog box from the X-Window system;

determining whether the Motif dialog box is to be supplanted; and supplanting the Motif dialog box;

wherein determining whether the Motif dialog box is to be supplanted includes:

calling a naming function to identify the Motif dialog box in the intercepted call; and comparing the name returned by the naming function against a plurality of Motif dialog box names that are to be supplanted;

wherein supplanting the Motif dialog box includes:

modifying at least one parameter in the intercepted function call, re-calling the display of the Motif dialog box with the modified parameter; and displaying a modified Motif dialog box.

2. The method of claim 1, wherein intercepting the function call includes calling the interposed function corresponding to an original function.

3. The method of claim 2, further comprising redirecting an operating system from the original function to the interposed function.

4. The method of claim 1, wherein supplanting the Motif dialog box includes:

calling a callback function; or suppressing the Motif dialog box.

5. A program storage medium encoded with instruction that, when executed by a computer, perform a method for supplanting a Motif dialog box, the encoded method comprising:

interposing a functionality between a graphical interface of an application and an Xt Library layered on top of an X-Window system;

intercepting an original function call from the graphical interface for a display of a Motif dialog box from the X-Window system;

determining whether the Motif dialog box is to be supplanted; and supplanting the Motif dialog box;

wherein determining whether the Motif dialog box is to be supplanted in the encoded method includes:

calling a naming function to identify the Motif dialog box in the intercepted call; and comparing the name returned by the naming function against a plurality of Motif dialog box names that are to be supplanted;

wherein supplanting the Motif dialog box includes:

modifying at least one parameter in the intercepted function call;

re-calling the display of the Motif dialog box with the modified parameter; and displaying a modified Motif dialog box.

6. The program storage medium of claim 5, wherein intercepting the function call in the encoded method includes calling the interposed function corresponding to an original function.

7. The program storage medium of claim 6, wherein the encoded method further comprises redirecting an operating system from the original function to the interposed function.

8. The program storage medium of claim 5, wherein supplanting the Motif dialog box in the encoded method includes:

calling a callback function; or suppressing the Motif dialog box.

9. A method programmed in a computing device to perform supplanting a Motif dialog box, the programmed method comprising:

interposing a functionality between a graphical interface of an application and an Xt Library layered on top of an X-Window system;

intercepting an original function call from the graphical interface for a display of a Motif dialog box from the X-Window system;

determining whether the Motif dialog box is to be supplanted; and supplanting the Motif dialog box;

wherein determining whether the Motif dialog box is to be supplanted in the programmed method includes:

calling a naming function to identify the Motif dialog box in the intercepted call; and comparing the name returned by the naming function against a plurality of Motif dialog box names that are to be supplanted;

wherein supplanting the Motif dialog box includes:

modifying at least one parameter in the intercepted function call;

re-calling the display of the Motif dialog box with the modified parameter; and displaying a modified Motif dialog box.

10. The programmed method of claim 9, wherein intercepting the function call in the programmed method includes calling the interposed function corresponding to an original function.

11. The programmed method of claim 10, wherein the programmed method further comprises redirecting an operating system from the original function to the interposed function.

12. The programmed method of claim 9, wherein supplanting the Motif dialog box in the programmed method includes:

calling a callback function; and suppressing the Motif dialog box.

13. The programmed method of claim 12, wherein intercepting the function call in the programmed method includes calling an interposed function corresponding to an original function.

14. The programmed method of claim 12, wherein the programmed method further comprises redirecting an operating system from the original function to the interposed function.

15. An apparatus for performing a method for supplanting a Motif dialog box, the apparatus comprising;

means for interposing a functionality between a graphical interface of an application and an Xt Library layered on top of an X-Window system;

means for intercepting an original function call from the graphical interface for a display of a Motif dialog box from the X-Window system;

means for determining whether the Motif dialog box is to be supplanted; and means for supplanting the Motif dialog box;
wherein determining whether the Motif dialog box is to be supplanted includes:
  means for calling a naming function to identify the Motif dialog box in the intercepted call; and
  means for comparing the name returned by the naming function against a plurality of Motif dialog box names that are to be supplanted;
wherein the means for supplanting the Motif dialog box includes:
  means for modifying at least one parameter in the intercepted function call;
  means for re-calling the display of the Motif dialog box with the modified parameter; and
  means for displaying a modified Motif dialog box.

16. The apparatus of claim 15, wherein the means for intercepting the function call includes means for calling the interposed function corresponding to an original function.

17. The apparatus of claim 16, further comprising means for redirecting an operating system from the original function to the interposed function.

18. The apparatus of claim 15, wherein the means for supplanting the Motif dialog box includes:
  means for calling a callback function; and
  means for suppressing the Motif dialog box.

19. A computing system programmed to supplant a Motif dialog box, the computing system comprising:
  an application including:
    a graphical interface;
    an X-Window system;
    an Xt library layered on top of the X-Window system, the Xt Library including an original function for calling the Motif dialog box; and
    an interposed library interposed between the graphical interface and the Xt library, the interposed library including an interposed function for intercepting the function call for the Motif dialog box, determining whether the Motif dialog box is to be supplanted, and supplanting the Motif dialog box;
  wherein determining whether the Motif dialog box is to be supplanted includes:
    calling a naming function to identify the Motif dialog box in the intercepted call; and
    comparing the name returned by the naming function against a plurality of Motif dialog box names that are to be supplanted;
  wherein supplanting the Motif dialog box includes:
    modifying at least one parameter in the intercepted call;
    re-calling the display of the Motif dialog box with the modified parameter; and displaying a modified Motif dialog box.

20. The computing system of claim 19, wherein the computing system comprises a single computing device.

21. The computing system of claim 19, wherein the computing system comprises a plurality of computing devices.

22. The computing system of claim 21, wherein the application resides on a first one of the plurality of computing devices and at least one of the X-Window system, the Xt library, and the interposed library reside on a second one of the plurality of computing devices.

23. The computing system of claim 19, wherein the application is either a Netscape Navigator™ application or an Adobe Acrobat™ reader application.

24. The computing system of claim 19, wherein the graphical interface is a Motif graphical interface.

25. The computing system of claim 19, wherein the original function is an original XtManageChild( ) function.

26. The computing system of claim 19, wherein the interposed function is an interposed XtManageChild( ) function.

27. The computing system of claim 19, wherein the computing system further comprises a data store of names of Motif dialog boxes to be supplanted.

28. The computing system of claim 19, wherein supplanting the Motif dialog box includes:
  calling a callback function; and
  suppressing the Motif dialog box.

29. A computing system programmed to supplant a Motif dialog box, the computing system comprising:
  an application including:
    a graphical interface;
    an X-Window system;
    an Xt library layered on top of the X-Window system, the Xt Library including an original function for calling a display of a Motif dialog box; and
    an interposed library interposed between the graphical interface and the Xt library, the interposed library including means for intercepting the function call for the display of the Motif dialog box, determining whether the Motif dialog box is to be supplanted, and supplanting the Motif dialog box;
  wherein the means includes:
    means for calling a naming function to identify the Motif dialog box in the intercepted call;
    means for comparing the name returned by the naming function against a plurality of Motif dialog box names that are to be supplanted;
    means for modifying at least one parameter in the intercepted call;
    means for re-calling the display of the Motif dialog box with the modified parameter; and
    means for displaying a modified Motif dialog box.

30. The computing system of claim 29, wherein the computing system comprises a single computing device.

31. The computing system of claim 29, wherein the computing system comprises a plurality of computing devices.

32. The computing system of claim 31, wherein the application resides on a first one of the plurality of computing devices and at least one of the X-Window system, the Xt library, and the interposed library reside, on a second one of the plurality of computing devices.

33. The computing system of claim 29, wherein the application is either a Netscape Navigator™ application or an Adobe Acrobat™ reader application.

34. The computing system of claim 29, wherein the graphical interface is a Motif graphical interface.

35. The computing system of claim 29, wherein the original function is an original XtManageChild( ) function.

36. The computing system of claim 29, wherein the means comprises an interposed XtManageChild( ) function.

37. The computing system of claim 29, wherein the computing system further comprises a data store of names of Motif dialog boxes to be supplanted.

38. The computing system of claim 29, wherein means includes: means for calling a callback function; and
  means for suppressing the Motif dialog box.

* * * * *